(12) United States Patent
Grosroyat

(10) Patent No.: US 10,960,992 B2
(45) Date of Patent: Mar. 30, 2021

(54) DEVICE FOR LOCKING TWO PARTS RELATIVE TO EACH OTHER

(71) Applicant: ArianeGroup SAS, Paris (FR)

(72) Inventor: Sylvain Grosroyat, Maule (FR)

(73) Assignee: ArianeGroup SAS, Paris (FR)

( * ) Notice: Subject to any disclaimer, the term of this patent is extended or adjusted under 35 U.S.C. 154(b) by 532 days.

(21) Appl. No.: 15/770,144

(22) PCT Filed: Oct. 5, 2016

(86) PCT No.: PCT/FR2016/000156
§ 371 (c)(1),
(2) Date: Apr. 20, 2018

(87) PCT Pub. No.: WO2017/068246
PCT Pub. Date: Apr. 27, 2017

(65) Prior Publication Data
US 2018/0297719 A1    Oct. 18, 2018

(30) Foreign Application Priority Data
Oct. 21, 2015 (FR) ..................... 1502230

(51) Int. Cl.
*B64G 1/64* (2006.01)
*B64G 1/22* (2006.01)
*F16B 45/04* (2006.01)

(52) U.S. Cl.
CPC ............ *B64G 1/222* (2013.01); *B64G 1/64* (2013.01); *F16B 45/04* (2013.01)

(58) Field of Classification Search
CPC .......... B64G 1/64; B64G 1/641; B64G 1/645; B64G 1/646; B64G 1/22; B64G 1/222
See application file for complete search history.

(56) References Cited

U.S. PATENT DOCUMENTS

| | | | | |
|---|---|---|---|---|
| 7,857,261 B2* | 12/2010 | Tchoryk, Jr. | ........... | B64G 1/646 244/172.4 |
| 9,231,323 B1* | 1/2016 | Jaeger | ................. | H01R 13/005 |
| 2007/0210212 A1* | 9/2007 | Tchoryk, Jr. | ........... | B64G 1/646 244/172.4 |
| 2009/0173832 A1* | 7/2009 | Hays | ..................... | B64G 1/646 244/172.4 |
| 2011/0200384 A1* | 8/2011 | Terry | ..................... | B64G 1/645 403/15 |
| 2012/0104177 A1* | 5/2012 | Choi | ...................... | B64G 1/222 244/173.3 |
| 2013/0294827 A1* | 11/2013 | Horie | ..................... | F16B 21/065 403/374.5 |
| 2017/0058929 A1* | 3/2017 | Shafer | ..................... | F16B 2/12 |

FOREIGN PATENT DOCUMENTS

EP         2468629 A1    6/2012

* cited by examiner

*Primary Examiner* — Daniel J Wiley
(74) *Attorney, Agent, or Firm* — Christensen O'Connor Johnson Kindness PLLC

(57) ABSTRACT

According to the present invention, the device, which is provided with a male element secured to one of the parts and a female element secured to the other of said parts, comprises a plurality of resilient fastening strips forming a flared receptacle for said male element inside said female element. This receptacle is slidably movable so as to capture, pull and hold said male element inside said female element.

14 Claims, 2 Drawing Sheets

DEVICE FOR LOCKING TWO PARTS RELATIVE TO EACH OTHER

The present invention relates to a locking device of two pieces one with regard to the other. Although not exclusively, it is particularly appropriate to be implemented in the field of space and it will be explained below in relation to this particular field.

It is known that satellites and space vehicles can comprise large-scale structures, such as radio or optical reflectors. To be able to be transported by the rockets, these structures must be conceived in several folding parts to enable their volume to be limited to a value that is compatible with the volume available on board said rockets, these folding parts being then unfolded and joined together after being dropped off from said rockets, to reassemble said structures.

Yet, owing to the large dimensions and the great flexibility of these structures and to kinematic inaccuracies of the deployment devices of said folding parts, it is often difficult, if not impossible, to reconstruct the structures, from said folding parts, with excellent geometrical precision.

The object of the present invention is to remedy this inconvenience.

To that end, in accordance with the present invention, the locking device of two pieces (or of two parts of one structure) one with regard to the other, comprising:
a first section fixed to one of said pieces and comprising a convergent male element; and
a second section fixed to the other of said pieces and comprising a divergent female element, of a complementary form to said convergent male element, is remarkable in that said second section additionally comprises:
  a casing, in contact with said divergent female element through the small section of the latter;
  a moveable body, arranged inside said casing and which can assume:
    either a cocked standby position in which said moveable body is kept inside said casing by a controllable blocking device,
    or a locking position in which said male element is locked into said female element, said moveable body moving automatically from said cocked standby position to said locking position by inhibition of the action of said blocking device by said male convergent element when it is inserted into the divergent female element; and
  a plurality of elastic hanging strips, connected to said moveable body and equipped with a hook on their free extremity opposite to the latter, said hanging strips:
    extending through said female divergent element spreading away from one another to form, for said convergent male element, a flared receptacle, elastically deformable, inside said divergent female element, and
    performing, during transition of said moveable body from the cocked standby position into the locking position and with the aid of said hooks, firstly the capture and the traction of said convergent male element, then, when said moveable body is in the locking position, the firm holding of said convergent male element against said divergent female element.

Thus, thanks to the present invention, at the end of the locking of the two pieces, which can be two parts of a structure, these are locked in a precise desired geometrical position, thanks to the capture, the guidance and the maintenance of position carried out by said elastic strips, acting in co-operation with said male and female elements.

Preferably, in order to ensure excellent guidance and excellent holding of the convergent male element by the divergent female element, it is advantageous that said hanging strips are housed in grooves of the internal wall of said divergent female element, said grooves guiding said hanging strips in a sliding motion while said moveable body moves from said cocked standby position to said locking position.

In addition, in the locking position, said elastic strips are retracted into said grooves, in such a way that the external wall of the convergent male element is in direct contact with the internal wall of the divergent female element, which ensures firm holding between said elements.

Preferably, said convergent male element comprises a transverse base for the hanging of the hanging strip hooks. Advantageously, this transverse base comprises an acute peripheral edge to facilitate the hanging of the hooks of said elastic strips.

Said convergent male element and said divergent female element can be of conical shape. However, in an embodiment prohibiting any rotation between said male and female elements after locking, they can be of pyramidal shape.

Advantageously, in the cocked standby position, said moveable body is loaded by at least one spring, of which the relaxation is under the control of said controllable blocking device. The latter can comprise at least one blocking finger which blocks said moveable body in said casing and a sliding trigger is provided for the control of said blocking finger, said sliding trigger being assembled in a limited sliding way in said moveable body and being accessible to said convergent male element inside said divergent female element.

Potentially, at least a spring bearing against said moveable body can press said sliding trigger in the direction of said divergent female element.

In an advantageous embodiment, said blocking finger can be positioned transversely to said sliding trigger and can push on the latter which then has a cam profile. Thus, thanks to such an arrangement, said blocking finger can, for a determined position of the sliding trigger, be moved radially by ending the blockage between said casing and said moveable body and by permitting the latter to move from the cocked standby position into the locking position.

A device for regulation of the pressure of said blocking finger on said sliding trigger can be provided.

Preferably, the locking device in line with the present invention is configured to be capable of moving from said locking position into said cocked standby position by simple intentional movement on said moveable body, to the interior of the latter. To that effect, it is advantageous that, from the opposite side of said divergent female element, said casing is open or opening to allow access to the moveable body.

The present invention also relates to a structure comprising at least two parts and at least one locking device, as described above, to lock said parts together.

The figures of the appended drawing will make it clear how the invention can be implemented. In these figures, identical references indicate similar elements.

Figure 1:
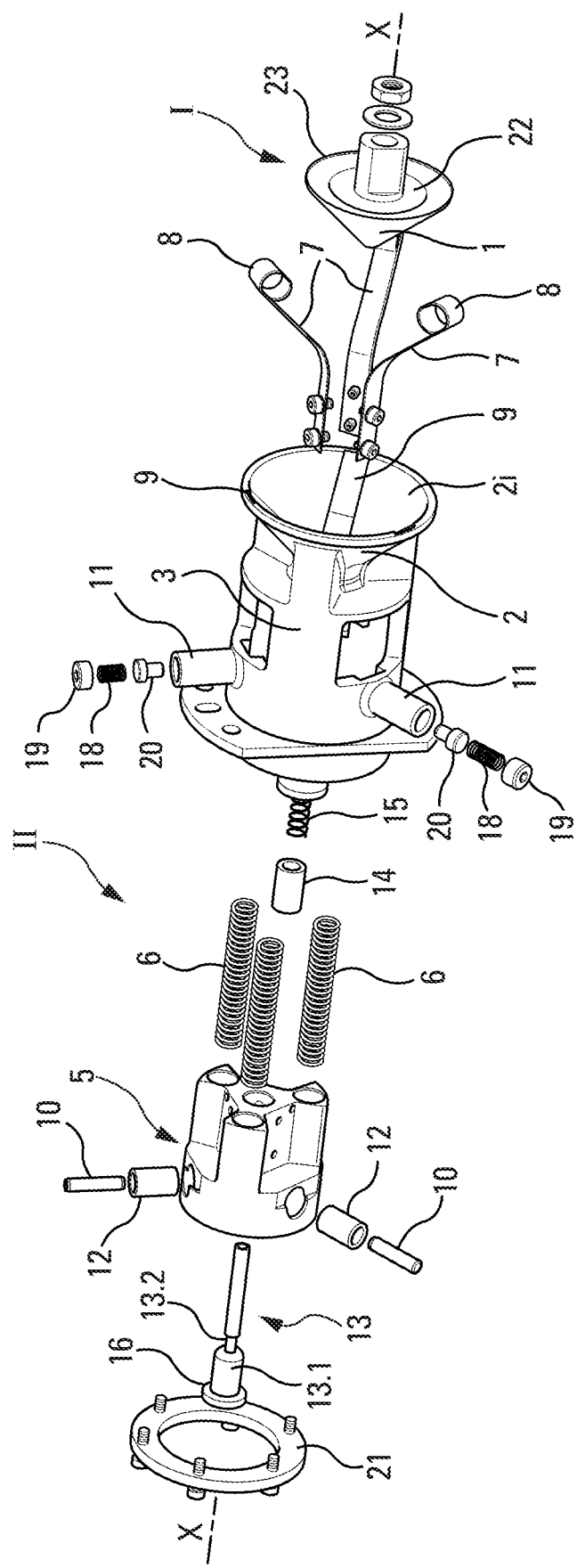
FIG. 1 is a view from fragmented perspective of an example of an embodiment of the locking device consistent with the present invention.

The locking device, consistent with the present invention and represented in FIGS. 1 to 5, comprises a first section I, fixed to a piece P1 (only represented schematically in FIG. 2) and equipped with a convergent male element 1, such as a cone or a pyramid, and a second section II, fixed to a piece P2 (also only represented schematically in FIG. 2) and equipped with a divergent female element 2 of X-X axis, of a complementary form to said male element 1. The pieces P1 and P2 can be two parts of the same structure.

The second section II of the locking device consistent with the invention also comprises a casing 3, also of X-X axis, together with said female element 2 and in contact with it, through the small section 4 of the latter, and a moveable body 5, arranged inside said casing 3, coaxially to the X-X axis, and able to slide there in the style of a piston, under the action or against the action of springs 6 (for example three, distributed regularly around the X-X axis of the casing 3) supported on said casing 3.

Said moveable body 5 supports a plurality of elastic hanging strips 7 with which it is connected and which are equipped with a hook 8 on their free extremity opposite to said moveable body 5. The elastic hanging strips 7 are arranged in said female element 2, spreading away from each other, and are housed in the grooves 9 of the internal wall 2i of said female element 2. The elastic hanging strips 7 can be three in number and are distributed regularly around the X-X axis of the casing 3 and the female element 2.

The second section II of the locking device also comprises a controllable blocking device of said moveable body 5. This blocking device comprises, for example, three radial blocking fingers 10 evenly spaced around the X-X axis, which are able to slide radially with respect to said moveable body 5, each in a round funnel 11 of the casing 3, thanks to a stage 12 which is placed there.

The radial blocking fingers 10 push radially on a sliding trigger 13 to a cam profile with a part of large diameter 13.1 and a part of small diameter 13.2, traversing said moveable body 5 and being able to slide there axially thanks to a stage 14. The sliding trigger 13 is pressed elastically, by a spring 15, in the direction of the female element 2 and is kept in the moveable body 5 by a stop 16 which it bears on the extremity opposite said female element. On its extremity housed in said female element, the sliding trigger 13 bears a widened button 17.

The pressure of the radial blocking fingers 10 on the sliding trigger 13 can be regulated thanks to springs 18 which are housed in the funnels 11 and whose force is adjusted by nuts 19 screwing in the latter. The triggers 20 can be inserted between the springs 18 and the blocking fingers 10.

On the opposite side of the female element 2, the casing 3 comprises a wall 21 allowing access to the moveable body 5 and to the sliding trigger 13. This wall 21 can be open, as is represented in the figures, or could be opening.

The convergent male element 1 comprises a hanging base 22 of which the peripheral edge 23 is acute to facilitate the hanging by the hooks 8 of the elastic strips 7.

Figure 2:
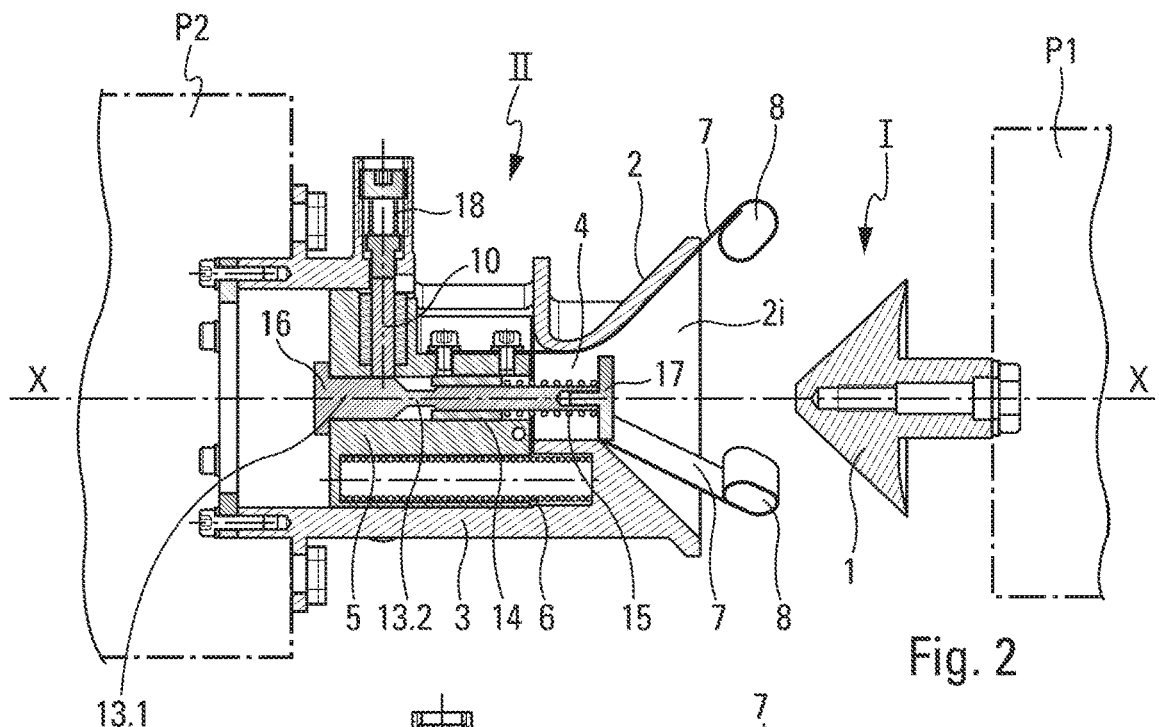
FIG. 2 illustrates, in longitudinal section, the locking device in FIG. 1 in cocked standby position.

As is shown in FIG. 2, in the cocked standby position, the moveable body 5 is positioned, in the casing 3, on the side of the female element 2 and is blocked in that position by the radial blocking fingers 10 mounted on the casing 3 and the moveable body 5. In addition, in this cocked standby position:

the springs 6 are squeezed between said casing 3 and said moveable body 5, the blocking fingers 10 press elastically on the section of large diameter 13.1 of the sliding trigger 13, being pressed by the springs 18, potentially, the sliding trigger 13 is pressed elastically by the spring 15 towards the female element 2, the button 17 extending to the interior of the latter and the stop 16 pressing against the moveable body 5 to keep said sliding trigger 13 in the latter, and the elastic strips 7 extend into the female element 2, being housed in the grooves 9 of the internal wall 2i of the latter and forming an elastically deformable flared receptacle.

Figure 3:
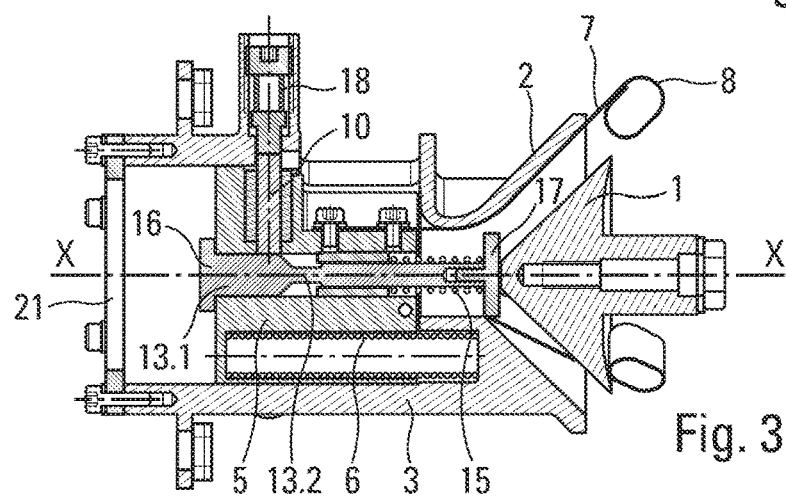
FIG. 3 illustrates, in longitudinal section, the locking device in FIGS. 1 and 2 just before the movement from said cocked standby position to the locking position.

This cocked standby position persists until the male element 1 comes into contact with the button 17 (see FIG. 3).

When the male element 1 presses the button 17, it compresses the spring 15 and the sliding trigger 13 moves away from the female element 2. While moving, the sliding trigger 13 moves past the blocking fingers 10, so that the part of large diameter 13.1 of said sliding trigger which faced said blocking fingers 10 is moved away from them and replaced by the part of small diameter 13.2 of said sliding trigger.

Under the action of the springs 18, said blocking fingers 10 slide radially in the funnels 11 to come to press against said part of small diameter 13.2, which allows said blocking fingers 10 to escape from the casing 3. The moveable body 5 is therefore no longer blocked by said casing 3 and it moves automatically into its interior, opposite the female element 2, under the action of the relaxation of the springs 6 to achieve the locking position represented in FIGS. 4 and 5.

Figure 5:
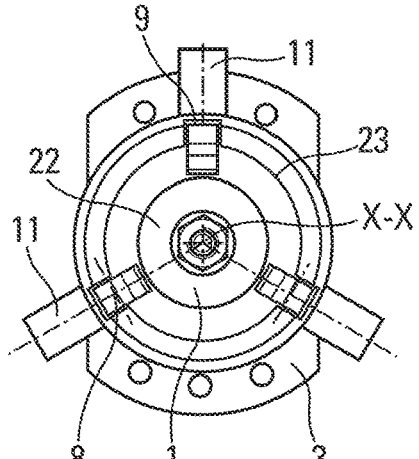
FIG. 5 is an end view, from the side of the convergent male element, of the locking device in the locking position in FIG. 4.
Figure 4:
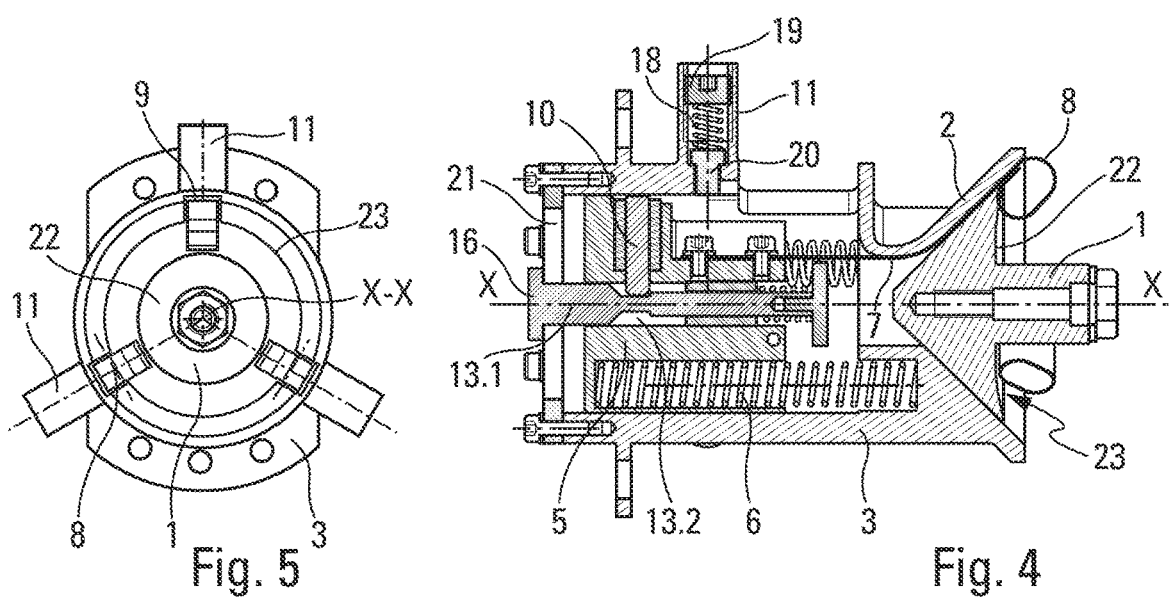
FIG. 4 illustrates, in longitudinal section, the locking device in FIGS. 1 to 3 in the locking position.

During the movement of the moveable body 5 from the cocked standby position in FIG. 2 to the locking position in FIGS. 4 and 5, the connected elastic strips 7 of said movable body 5 slide, guided, into the grooves 9 of the internal wall 2i of the female element 2 and, with the help of their hooks 8, catch the acute edge 23 of the base 22 of the male element 1, pull it towards said female element 2, then hold it firmly against the latter, while the locking position in FIGS. 4 and 5 is achieved.

It will be easily understood that the locking device in accordance with the present invention is reversible, that is to say the device can be moved from the locking position into the cocked standby position by pressing said sliding trigger 13 and said moveable body 5 in the direction of the female element 2. This manoeuvre is carried out during the initial outfitting of the device, before the introduction of the male element 1 to the female element. The device can also be operated after locking said male element 1, to release said element, on the condition that said male element 1 is not set against the sliding of the moveable body 5 in its direction.

The invention claimed is:

1. A locking device for locking two pieces to each other, the device comprising:
   a first section, fixed to one of said pieces and comprising a convergent male element; and
   a second section, fixed to the other of said pieces and comprising a divergent female element, of a complementary form to said convergent male element, wherein said second section also comprises:
   a casing, in contact with said divergent female element through a small section of the divergent female element;
   a moveable body arranged inside said casing and being able to assume:

either a cocked standby position in which said moveable body is kept inside said casing by a controllable blocking device, or a locking position in which said male element is locked into said female element, said moveable body moving automatically from said cocked standby position into said locking position by inhibition of the action of said blocking device by said convergent male element while it is inserted into said divergent female element; and a plurality of elastic hanging strips, connected to said moveable body and each equipped with a hook on an extremity thereof opposite to the moveable body, said hanging strips:

extending through said divergent female element and spreading away from one another to form, for said convergent male element, a flared receptacle, elastically deformable, inside said divergent female element, and performing, during transition of said moveable body from the cocked standby position into the locking position with the aid of said hooks, firstly the capture and the traction of said convergent male element, then, when said moveable body is in the locking position, the holding of said convergent male element against said divergent female element.

2. The locking device according to claim 1, wherein said hanging strips are housed in grooves of an internal wall of said divergent female element, said grooves guiding said hanging strips in a sliding motion while said moveable body moves from said cocked standby position into said locking position.

3. The locking device according to claim 1, wherein said convergent male element comprises a transverse base for the hanging of the hooks of the hanging strips.

4. The locking device according to claim 3, wherein said transverse base comprises an acute edge for the hanging of the hooks of said elastic strips.

5. The locking device according to claim 1, wherein said convergent male element and said divergent female element are conical.

6. The locking device according to claim 1, wherein said convergent male element and said divergent female element are pyramidal.

7. The locking device according to claim 1, wherein, in the cocked standby position, said moveable body is loaded by at least one spring, of which the relaxation is under the control of said controllable blocking device.

8. The locking device according to claim 1, wherein said controllable blocking device comprises at least one blocking finger blocking said moveable body in said casing and a sliding trigger for the control of said blocking finger, said sliding trigger being mounted in a limited sliding fashion in said moveable body and being accessible to said convergent male element within said divergent female element.

9. The locking device according to claim 8, wherein at least one spring supporting said moveable body presses said sliding trigger in the direction of said divergent female element.

10. The locking device according to claim 8, wherein said blocking finger is transverse with regard to said sliding trigger and presses against the sliding trigger, and in that said sliding trigger has a cam profile.

11. The locking device according to claim 10, further comprising a device for the regulation of the applied pressure of said blocking finger on said sliding trigger.

12. The locking device according to claim 8, wherein the moveable body is able to move from said locking position into said cocked standby position by automatic action on said moveable body and said sliding trigger.

13. The locking device according to claim 12, wherein on the opposite side of said divergent female element, said casing is open.

14. A structure comprising at least two parts, wherein the structure comprises at least one locking device according to claim 1 for locking said parts together.

* * * * *